(12) United States Patent
Park et al.

(10) Patent No.: US 10,574,385 B2
(45) Date of Patent: Feb. 25, 2020

(54) APPARATUS AND METHOD FOR RATE CONTROL IN MOBILE COMMUNICATION SYSTEM

(71) Applicant: Samsung Electronics Co., Ltd., Gyeonggi-do (KR)

(72) Inventors: Hyo-Yol Park, Seoul (KR); Yun-Seok Choi, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/173,786

(22) Filed: Oct. 29, 2018

(65) Prior Publication Data

US 2019/0068311 A1 Feb. 28, 2019

Related U.S. Application Data

(63) Continuation of application No. 14/584,623, filed on Dec. 29, 2014, now Pat. No. 10,116,412.

(30) Foreign Application Priority Data

Dec. 27, 2013 (KR) ........................ 10-2013-0165325

(51) Int. Cl.
*H04L 1/00* (2006.01)
(52) U.S. Cl.
CPC .......... *H04L 1/0002* (2013.01); *H04L 1/0021* (2013.01)
(58) Field of Classification Search
None
See application file for complete search history.

(56) References Cited

U.S. PATENT DOCUMENTS

| 6,118,817 A | 9/2000 | Wang |
| 6,539,205 B1 | 3/2003 | Wan |
| 6,618,591 B1 | 9/2003 | Kalliokulju |
| 6,961,890 B2 | 11/2005 | Smith |
| 8,300,716 B1 | 10/2012 | Lee |
| 2002/0018446 A1 | 2/2002 | Huh |

(Continued)

FOREIGN PATENT DOCUMENTS

| KR | 1020070057089 | 6/2007 |
| KR | 10-2010-0085713 | 7/2010 |
| KR | 1020100076843 | 7/2010 |

OTHER PUBLICATIONS

Korean Office Action dated Dec. 19, 2019 issued in counterpart application No. 10-2013-0165325, 10 pages.

*Primary Examiner* — Phirin Sam
*Assistant Examiner* — Tarell A Hampton
(74) *Attorney, Agent, or Firm* — The Farrell Law Firm, P.C.

(57) ABSTRACT

A method and apparatus are provided for controlling a data rate in a mobile communication system. The method includes changing an offset from a first offset used in a previous packet to a second offset determined based on whether or not the previous packet is successfully received by a second apparatus; determining whether or not a second channel quality in which the second offset is applied is within a range from a minimum quality to a maximum quality; if it is determined that the second channel quality is not within the range, determining that the offset is maintained as the first offset in a current packet; and transmitting, to the second apparatus, the current packet according to a first channel quality in which the first offset is applied.

20 Claims, 8 Drawing Sheets

(56) References Cited

U.S. PATENT DOCUMENTS

| | | |
|---|---|---|
| 2002/0053058 A1 | 5/2002 | Lee |
| 2002/0141349 A1 | 10/2002 | Kim |
| 2003/0043764 A1* | 3/2003 | Kim .................... H04L 1/0003 370/329 |
| 2003/0083088 A1 | 5/2003 | Chang |
| 2003/0123406 A1 | 7/2003 | Yavuz |
| 2003/0123598 A1 | 7/2003 | Gollamudi |
| 2003/0126536 A1 | 7/2003 | Gollamudi |
| 2003/0152058 A1 | 8/2003 | Cimini, Jr. |
| 2003/0204615 A1 | 10/2003 | Wei |
| 2004/0120280 A1 | 6/2004 | Western |
| 2004/0151122 A1 | 8/2004 | Lau |
| 2004/0228287 A1 | 11/2004 | Seol |
| 2004/0228298 A1 | 11/2004 | Lee |
| 2005/0053038 A1 | 3/2005 | Kimura |
| 2005/0143120 A1 | 6/2005 | Cave |
| 2005/0152465 A1 | 7/2005 | Maltsev |
| 2005/0169391 A1 | 8/2005 | Takeda |
| 2005/0286440 A1 | 12/2005 | Strutt |
| 2006/0129567 A1 | 6/2006 | Uchida |
| 2006/0274702 A1 | 12/2006 | Li |
| 2007/0053287 A1 | 3/2007 | Li |
| 2007/0133476 A1 | 6/2007 | Li |
| 2007/0298728 A1 | 12/2007 | Imamura |
| 2007/0298822 A1 | 12/2007 | Wan |
| 2008/0117998 A1 | 5/2008 | Kato |
| 2008/0159192 A1 | 7/2008 | Lee |
| 2008/0232301 A1 | 9/2008 | Cai |
| 2008/0240216 A1 | 10/2008 | Kolding |
| 2008/0267168 A1 | 10/2008 | Cai |
| 2009/0290541 A1 | 11/2009 | Nishio |
| 2010/0067401 A1 | 3/2010 | Medvedev |
| 2010/0128650 A1 | 5/2010 | Morimoto |
| 2010/0142459 A1* | 6/2010 | Tu ........................ H04L 1/0003 370/329 |
| 2010/0182951 A1 | 7/2010 | Park et al. |
| 2010/0189025 A1 | 7/2010 | Cheng |
| 2010/0254479 A1 | 10/2010 | Liao |
| 2010/0284454 A1 | 11/2010 | Oteri |
| 2010/0309850 A1* | 12/2010 | Andrews ............... H04W 52/12 370/328 |
| 2011/0007790 A1 | 1/2011 | Xu |
| 2011/0268065 A1 | 11/2011 | Park |
| 2012/0142385 A1 | 6/2012 | Choi |
| 2012/0276896 A1 | 11/2012 | Ren |
| 2012/0287813 A1 | 11/2012 | Alm |
| 2013/0033989 A1 | 2/2013 | Barbieri |
| 2013/0077506 A1 | 3/2013 | Hu |
| 2013/0095748 A1 | 4/2013 | Hu |
| 2013/0310092 A1 | 11/2013 | Tabet |
| 2013/0322241 A1 | 12/2013 | Fantaye |
| 2014/0003260 A1 | 1/2014 | Tabet |
| 2014/0126467 A1 | 5/2014 | Lu |
| 2015/0124709 A1 | 5/2015 | Ren |
| 2016/0226623 A1 | 8/2016 | Froberg Olsson |

\* cited by examiner

APPARATUS AND METHOD FOR RATE CONTROL IN MOBILE COMMUNICATION SYSTEM

PRIORITY

The present application is a Continuation of U.S. Ser. No. 14/584,623, which was filed in the U.S. Patent and Trademark Office on Dec. 29, 2014, and claims priority under 35 U.S.C. § 119 to Korean Application Serial No. 10-2013-0165325, which was filed in the Korean Intellectual Property Office on Dec. 27, 2013, the entire content of each of which is incorporated herein by reference.

BACKGROUND OF THE INVENTION

1. Field of the Invention

The present invention relates generally to rate control in a mobile communication system.

2. Description of the Related Art

Link Adaption (LA), which is a technology for adapting to a channel change with time in a radio channel environment, includes Closed Loop Rate Control (CLRC) and Open Loop Rate Control (OLRC).

In CLRC, a receiving end estimates quality information of a channel and determines an optimum code rate to obtain a desired target error rate with estimated channel quality. The error rate may be either a Frame Error Rate (FER) or a Packet Error Rate (PER), and the code rate may be a Codec rate. The determined code rate information may be input to a transmitting end such that next data can be transmitted at the corresponding code rate. CLRC has the advantage of adapting quickly to a channel change. However, performance information on channel quality and a code rate should be known in advance. If the advance performance information is different from the performance in a real radio channel environment, optimal adaptation is difficult to achieve.

OLRC is an improvement to overcome the disadvantages of CLRC. That is, when an error rate estimated by a receiving end is higher than a target error rate, a positive (+) offset value is input to a threshold value used in CLRC such that a lower code rate can be selected, and when an error rate estimated by the receiving end is lower than a target error rate, a negative (−) offset value is input to the threshold value such that a higher code rate can be selected. In this manner, OLRC can guarantee a target error rate that is difficult to guarantee with only CLRC.

In OLRC, if the radio channel environment is very good and thus a current error rate becomes better than a target error rate, the offset value decreases, and if the radio channel environment is very poor and thus a current error rate becomes worse than a target error rate, the offset value increases. If the offset value decreases or increases in this manner, there is a problem that it is difficult to adapt quickly when the channel state is reversed. There is a method for limiting a maximum value and a minimum value of the offset in order to solve this problem. However, if the offset is within a narrow range, the benefits of OLRC are not maximized, and if the offset is within a wide range, there is a problem that it is difficult to adapt quickly to a channel change as in the related-art method. Accordingly, there is a need in the art for an improved method for controlling a data rate in a mobile communication system.

SUMMARY OF THE INVENTION

Aspects of the present invention are to address at least the above-mentioned problems and/or disadvantages and to provide at least the advantages described below. Accordingly, an aspect of the present invention is to provide an apparatus and method for controlling a data rate in a mobile communication system.

Another aspect of the present invention is to provide an apparatus and method for adapting quickly when a channel state abruptly changes in a mobile communication system.

Another aspect of the present invention is to provide an apparatus and method for enhancing transmission efficiency in a mobile communication system.

Another aspect of the present invention is to provide an apparatus and method for adapting to a channel state by maintaining, without updating, an offset value when a channel state is in the extreme in a mobile communication system.

According to an aspect of the present invention, a method is provided for operating a first apparatus in a wireless communication system. The method includes changing an offset from a first offset used in a previous packet to a second offset determined based on whether or not the previous packet is successfully received by a second apparatus; determining whether or not a second channel quality in which the second offset is applied is within a range from a minimum quality to a maximum quality; if it is determined that the second channel quality is not within the range, determining that the offset is maintained as the first offset in a current packet; and transmitting, to the second apparatus, the current packet according to a first channel quality in which the first offset is applied.

According to another aspect of the present invention, a first apparatus is provided of use in a wireless communication system. The first apparatus includes at least one transceiver; and at least one processor operably coupled to the at least one transceiver. The at least one processor is configured to change an offset from a first offset used in a previous packet to a second offset determined based on whether or not the previous packet is successfully received by a second apparatus, determine whether or not a second channel quality in which the second offset is applied is within a range from a minimum quality to a maximum quality, if it is determined that the second channel quality is not within the range, determine that the offset is maintained as the first offset in a current packet, and transmit, to the second apparatus, the current packet according to a first channel quality in which the first offset is applied.

According to another aspect of the present invention, a second apparatus is provided of use in a wireless communication system. The second apparatus includes at least one transceiver; and at least one processor operably coupled to the at least one transceiver. The at least one processor is configured to transmit, to a first apparatus, a signal for indicating whether or not a previous packet is successfully received, wherein a first offset is used in the previous packet, and receive, from the first apparatus, a current packet based on the signal. The signal is used by the first apparatus to determine a second offset. If a second channel quality in which the second offset is applied is not within a range from a minimum quality to a maximum quality, the current packet corresponds to a first channel quality in which the first offset is applied. If the second channel quality is within the range, the current packet corresponds to the second channel quality.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION

Figure 1:
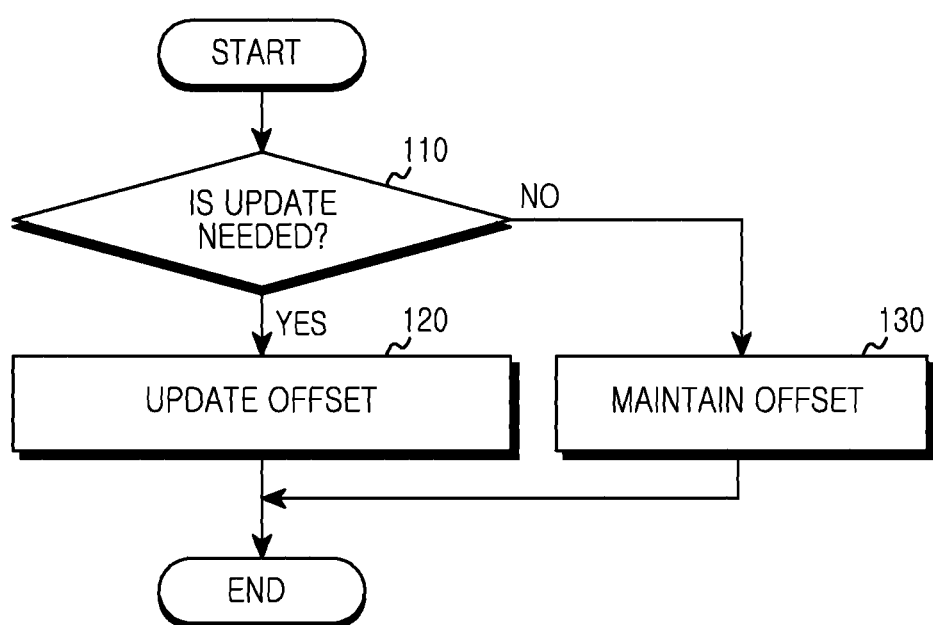
FIG. 1 illustrates a process for controlling an offset in a mobile communication system according to an embodiment of the present invention.

Embodiments of the present invention will be described herein with reference to the accompanying drawings. In the following description, details of well-known functions or configurations will be omitted when they would obscure the subject matter of the present invention. Also, terms used herein may be defined in accordance with the functions of the present invention. Therefore, the terms should be understood based on the following description.

In a mobile communication system, rate control aims at adapting to a changing channel state and satisfying a Carrier to Interference and Noise Ratio (CINR) which refers to a required channel quality value. The mobile communication system may provide a plurality of link tables optimized according to a moving speed and a surrounding environment to control the rate effectively. The link table refers to a data transmission method that is pre-defined according to the CINR, and generally defines a CINR value which satisfies a predetermined error rate for each MCS level according to a channel change. Accordingly, a receiving end may determine a transmission method according to a CINR of a channel by using a link table which varies according to a channel model.

According to an embodiment of the present invention, a receiving end in a mobile communication system adjusts an offset to control the CINR. When an error rate estimated by the receiving end is higher than a target error rate, a positive offset value is input to a threshold value such that a lower code rate can be selected. When an error rate estimated by the receiving end is lower than a target error rate, a negative offset value is input to the threshold value such that a higher code rate can be selected.

The receiving end determines an amount of change for updating the offset by using the presence/absence of an error regarding a frame and a target error rate value. In particular, according to an embodiment of the present invention, the receiving end determines whether to maintain the offset value by using the presence/absence of an error regarding the frame, a code rate, and a state of the offset. When the code rate is a minimum value, the offset is not adjusted to decrease, and when the code rate is a maximum value, the offset is not adjusted to increase. When the code rate quickly becomes the maximum value or the minimum value, and the offset is updated, the receiving end could not adapt quickly to the code rate when a channel state changes. Accordingly, when the code rate is the maximum or minimum value, the receiving end does not update the offset in order to adapt quickly to the code rate.

It is determined whether the offset is maintained without being updated based on the presence/absence of an error, a code rate, and a state of the offset, that is, whether the offset value is greater than or less than 0. The offset is not updated and is maintained in two instances. The first instance is when an error exists in a frame received by the receiving end, a code rate of a previous frame is the lowest, and a previous offset value is less than 0. The second instance is when an error does not exist in the received frame, the code rate of the previous frame is the highest, and the previous offset value is greater than 0. The presence/absence of the error in the frame is determined by performing a Cyclic Redundancy Check (CRC) for every frame.

FIG. 1 illustrates a process for controlling an offset in a mobile communication system according to an embodiment of the present invention.

Referring to FIG. 1, the receiving end determines whether to update an offset in step 110. The offset indicates a deviation of a target value and a control value. In the present invention, the offset also indicates a difference between a measured channel quality value and a channel quality value which is used for determining a code rate. The offset may be updated to correct a difference between an error rate and a target error rate according to a channel state. Accordingly, it is determined whether the offset is updated based on a state of a frame, that is, an error rate of a current frame and a target error rate. For example, when a current error rate is lower than a target error rate, the receiving end updates the offset to increase. When a current error rate is higher than a target error rate, the receiving end updates the offset to decrease.

In particular, according to an embodiment of the present invention, the receiving end updates the offset unless a code rate is a maximum value or a minimum value. However, the offset is not updated and is maintained in two instances. Specifically, the first instance is when an error exists in the frame received at the receiving end, a code rate of a previous frame is the lowest, and a previous offset value is less than 0. The second instance is when an error does not exist in the received frame, the code rate of the previous frame is the highest, and the previous offset value is greater than 0. When the code rate is a minimum value, the offset is not adjusted to decrease, and when the code rate is a maximum value, the offset is not adjusted to increase.

Accordingly, when either one of the two instances occurs, that is, when the offset does not need to be updated, the receiving end proceeds to step 130. That is, the offset is not updated and the previous offset value is maintained. Specifically, the offset is precluded from decreasing when the code rate is a minimum value and is precluded from increasing when the code rate is a maximum value.

When neither of the two instances occurs and thus the offset needs to be updated, the receiving end proceeds to step 120 to determine an amount of change for updating the offset based on the presence/absence of an error through CRC and a target error rate.

Figure 2:
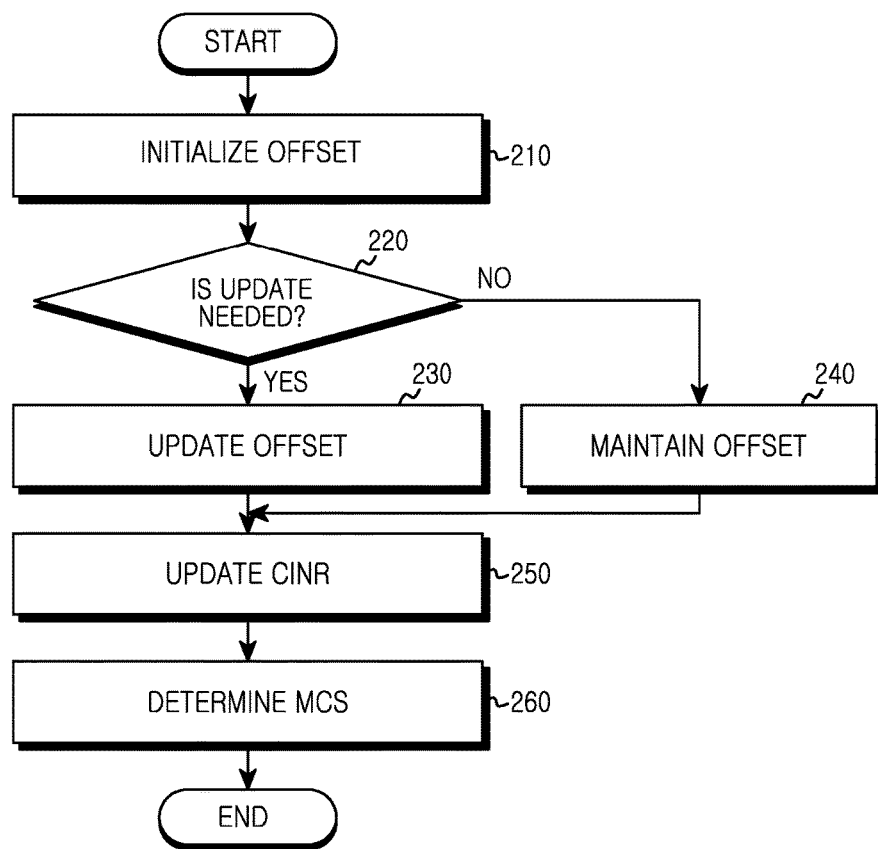
FIG. 2 illustrates a process for determining a code rate in a mobile communication system according to an embodiment of the present invention.

FIG. 2 illustrates an example for determining a code rate in a mobile communication system according to an embodiment of the present invention.

Referring to FIG. 2, the receiving end initializes an offset in step 210. The receiving end initializes the offset when a call setup which is a process of establishing a communication line between the receiving end and the transmitting end is performed, an intra cell handover is performed, an inter-cell handover is performed, or a Codec is changed.

The receiving end checks a frame state and determines whether to update the offset in step 220, and a value indicating success/failure in receiving a frame is used. The value indicating success/failure in receiving the frame may be referred to as a Bad Frame Indicator (BFI). When the BFI is 0, the BFI indicates that the frame is successfully received, and when the BFI is 1, the BFI indicates that the reception of the frame fails.

The BFI is determined according to a result of CRC. That is, when the BFI is 0, the BFI indicates CRC success, and when the BFI is 1, the BFI indicates CRC failure. When the BFI is 1 as a result of checking the BFI of the frame, a latest code rate is the lowest, and a previous offset is less than 0, the receiving end does not update the offset and maintains the existing offset value. In addition, when the BFI is 0, the latest code rate is the highest, and the previous offset is greater than 0, the receiving end does not update the offset and maintains the existing offset value. That is, when the error rate is higher than a reference value even at a low code rate and when the error rate is lower than the reference value even at a high code rate, the receiving end determines that the offset no longer needs to be updated and maintains the previous offset value.

When it is determined that the update is needed, the receiving end updates the offset in step 230. If the update is not needed, the receiving end maintains the offset in step 240. The offset is updated by Equation (1), as follows:

$$\text{Offset}(k) = \text{Offset}(k-1) + \left(\frac{(1-BFI) \times TargetFER}{(1-TargetFER)} - BFI\right) \times StepSize \quad (1)$$

In Equation (1), Offset (k) is an offset value, Offset (k−1) is a previous offset value, the BFI is 0 when CRC succeeds, and the BFI is 1 when CRC fails. Target FER is a target Frame Error Rate (FER), and may be a target Packet Error Rate (PER). StepSize is an amount of change of the offset and has a positive value.

When the BFI value is 1 in Equation (1), that is, when the state of the frame is poor and thus CRC fails, Equation (1) may be expressed by Equation (2), as follows:

$$\text{Offset}(k) = \text{Offset}(k-1) - StepSize \quad (2)$$

In Equation (2), Offset (k) is an offset value, Offset (k−1) is a previous offset value, and StepSize is an amount of change of the offset.

In addition, when the BFI value is 0 in above Equation (1), that is, when the state of the frame is good and thus CRC succeeds, Equation (1) may be expressed by Equation (3), as follows:

$$\text{Offset}(k) = \text{Offset}(k-1) + \frac{TargetFER}{(1-TargetFER)} \times StepSize \quad (3)$$

In Equation (3), Offset (k) is an offset value, Offset (k−1) is a previous offset value, and StepSize is a value for adjusting a size by which the offset is changed. Target FER is a target FER, which may be a target PER. The StepSize is an amount of change of the offset and has a positive value.

Referring back to FIG. 2, when it is determined that the update is not needed, the receiving end proceeds to step 240 and maintains the offset. However, when it is determined that the update is needed, the offset is updated in step 230, and the receiving end updates a CINR value in step 250. The CINR value is updated by adding the offset to a previous CINR value as shown in Equation (4) as follows:

$$CINR(k) = CINR(k-1) + \text{Offset}(k) \quad (4)$$

In Equation (4), CINR (k) is a CINR value, CINR (k−1) is a previous CINR value, and Offset (k) is an offset value. When the offset is updated, the CINR value is updated by adding the updated offset value to the CINR value, and, when the offset is not updated, the CINR value is updated by adding the previous offset value to the CINR value. The receiving end may transmit the updated CINR value to the transmitting end to request the transmitting end to transmit the data at the updated CINR value.

After updating the CINR in step 250, the receiving end determines an MCS in step 260. The receiving end determines an MCS level to be applied to a new frame or packet by comparing the updated CINR value and a link table. The link table is a memory table in which a CINR threshold value is defined for each MCS level supported in the system. The receiving end may modulate the new frame or data according to the determined MCS level and may transmit the new frame or data to the transmitting end.

Figure 3:
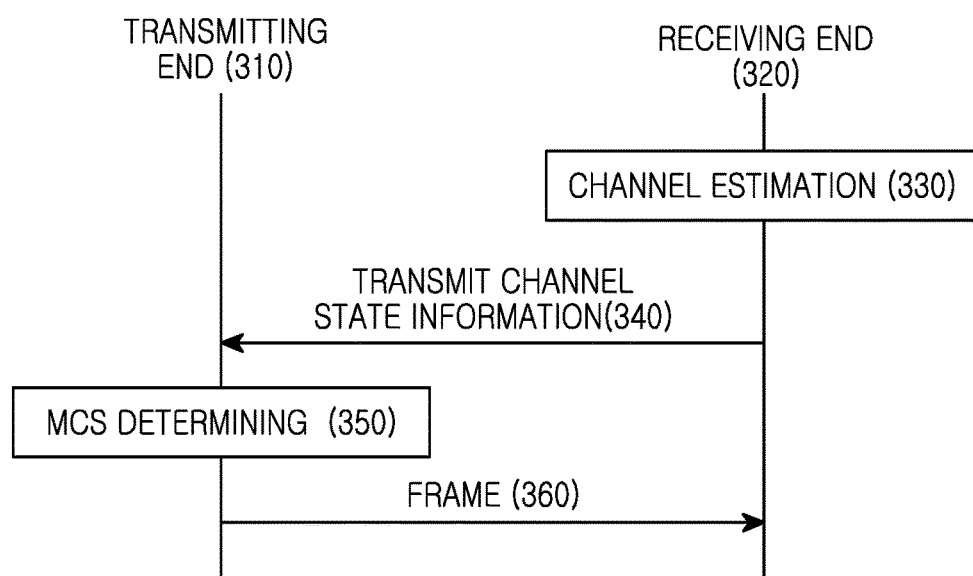
FIG. 3 illustrates a signal flow between a receiving end and a transmitting end when a Modulation and Coding Scheme (MCS) is controlled at the transmitting end according to an embodiment of the present invention.

FIG. 3 illustrates a signal flow between a receiving end 320 and a transmitting end 310 when an MCS is controlled at the transmitting end 310 according to an embodiment of the present invention.

Referring to FIG. 3, the receiving end 320 estimates a channel in step 330 by using a signal received from the transmitting end 310. The receiving end 320 transmits channel state information on the estimated channel to the transmitting end 310 in step 340. In this instance, a channel coefficient or the CINR may be used as the channel state information. The transmitting end 310 then determines a proper MCS level in step 350 by comparing the CINR received from the receiving end 320 and the link table, and then transmits frame information to receiving end 320.

Figure 4:
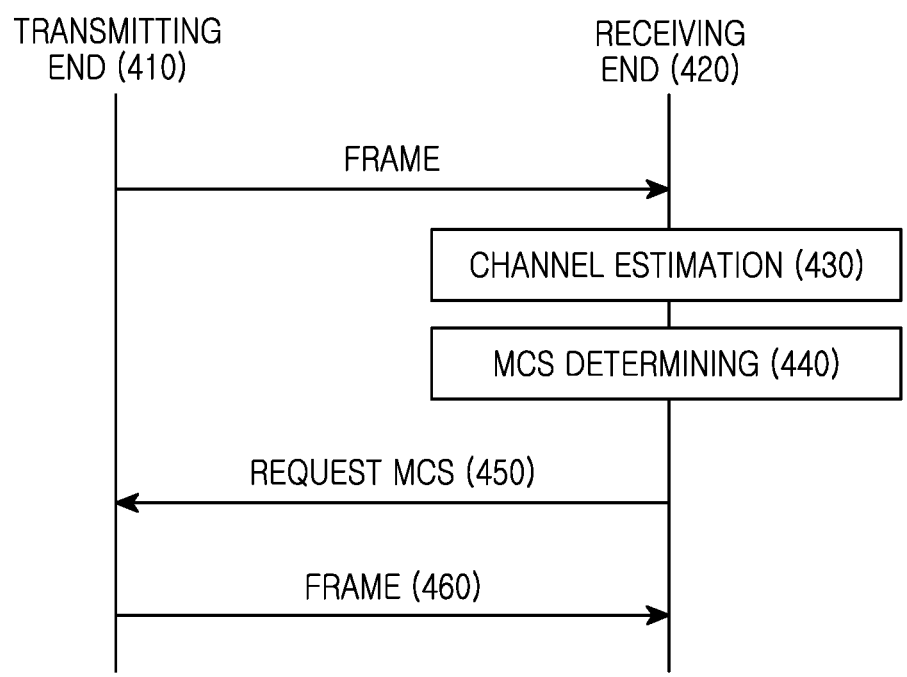
FIG. 4 illustrates a signal flow between a receiving end and a transmitting end when an MCS is controlled at the receiving end according to an embodiment of the present invention.

FIG. 4 illustrates a signal flow between a receiving end 420 and a transmitting end 410 when an MCS is controlled at the receiving end 420.

Referring to FIG. 4, the transmitting end 410 transmits frame information to the receiving end 420, and the receiving end 420 estimates a channel by using a signal received from the transmitting end 410 in step 430. In this instance, a channel coefficient or the CINR may be used as channel state information. The receiving end 420 determines a proper MCS level by comparing the CINR and the link table in step 440, and requests the corresponding MCS level from the transmitting end 410 in step 450. The transmitting end 410 transmits frame information to the receiving end 420 in step 460.

Figure 5:
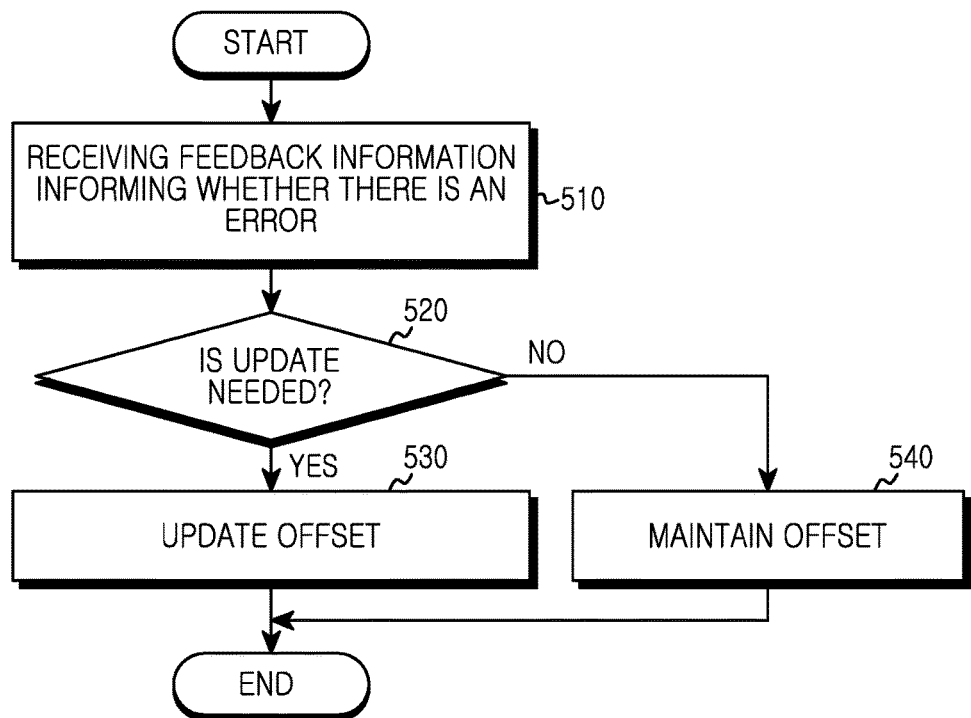
FIG. 5 illustrates a process for determining an MCS of a transmitting end in a mobile communication system according to an embodiment of the present invention.

FIG. 5 illustrates a process for determining an MCS of a transmitting end in a mobile communication system according to an embodiment of the present invention.

Referring to FIG. 5, the transmitting end receives feedback information from the receiving end in step 510. The receiving end checks an error regarding data received from the transmitting end and determines normal/abnormal reception according to the presence/absence of the error. The receiving end feeds the normal/abnormal reception back to the transmitting end. The receiving end estimates a channel and transmits quality information of the estimated channel to the transmitting end.

The transmitting end determines whether to update an offset in step 520. The offset may be updated to overcome a difference between an error rate and a target error rate according to a channel state. Accordingly, it is determined whether the offset is updated according to a state of a frame based on feedback information received from the receiving end, that is, an error rate of the current frame and a target error rate. For example, when the current error rate is lower than the target error rate, the transmitting end updates the offset to increase, and, when the current error rate is higher than the target error rate, the transmitting end updates the offset to decrease.

In particular, according to an embodiment of the present invention, the transmitting end updates the offset unless a code rate is a maximum value or a minimum value.

When the code rate is a maximum value or a minimum value, the transmitting end does not update the offset to adapt quickly to the code rate. It is determined whether the offset is updated with reference to the presence/absence of an error of the frame, a code rate, and an offset value based on the feedback information received from the receiving end. The offset may not be updated and may be maintained in two instances. The first instance is when a frame error exists in the feedback information received from the receiving end, a code rate of a previous frame is the lowest, and a previous offset value is less than 0. The second instance is when a frame error does not exist in the feedback information received from the receiving end, the code rate of the previous frame is the highest, and the previous offset value is greater than 0. The presence/absence of the error in the frame is determined by performing CRC for every frame.

When either one of the two instances occurs, that is, when the offset does not need to be updated, the transmitting end proceeds to step 540 to maintain the previous offset value without updating the offset value.

When neither of the two instances occurs and thus the offset needs to be updated, the transmitting end proceeds to step 530 to update the offset according to the presence/absence of the error through CRC and the target error rate.

Figure 6:
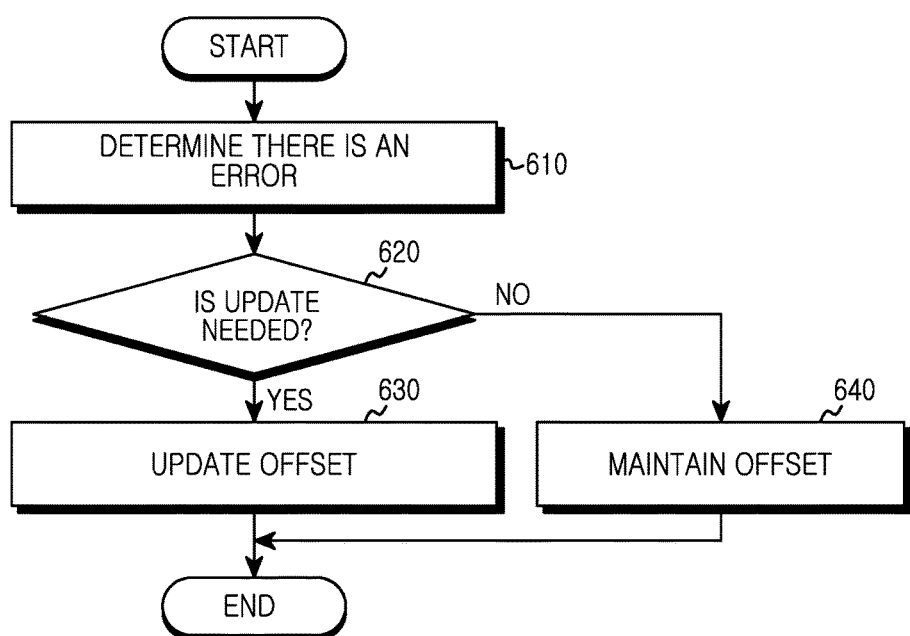
FIG. 6 illustrates a process for determining an MCS of a receiving end in a mobile communication system according to an embodiment of the present invention.

FIG. 6 illustrates a process for determining an MCS of a receiving end in a mobile communication system according to an embodiment of the present invention.

Referring to FIG. 6, the receiving end checks an error regarding data received from the transmitting end and determines normal/abnormal reception according to the presence/absence of the error in step 610.

The receiving end determines whether to update an offset in step 620. The offset may be updated to overcome a difference between an error rate and a target error rate according to a channel state. Accordingly, it is determined whether the offset is updated according to a state of a frame received at the receiving end, that is, an error rate of a current frame and a target error rate. For example, when the current error rate is lower than the target error rate, the receiving end updates the offset to increase, and, when the current error rate is higher than the target error rate, the receiving end updates the offset to decrease.

In particular, according to an embodiment of the present invention, the receiving end updates the offset unless a code rate is a maximum value or a minimum value.

When the code rate is a maximum value or a minimum value, the receiving end does not update the offset to adapt quickly to the code rate. The receiving end may determine whether to maintain, and not to update the offset, with reference to the presence/absence of an error of the received frame, a code rate, and an offset value. The offset is not updated and is maintained in two instances. The first instance is when an error exists in the received frame, a code rate of a previous frame is the lowest, and a previous offset value is less than 0. The second instance is when an error does not exist in the received frame, the code rate of the previous frame is the highest, and the previous offset value is greater than 0. It is determined whether an error exists in the frame by performing CRC for every frame.

When either of the two instances occurs, that is, the offset does not need to be updated, the receiving end proceeds to step 640 and maintains the previous offset value.

Figure 7:
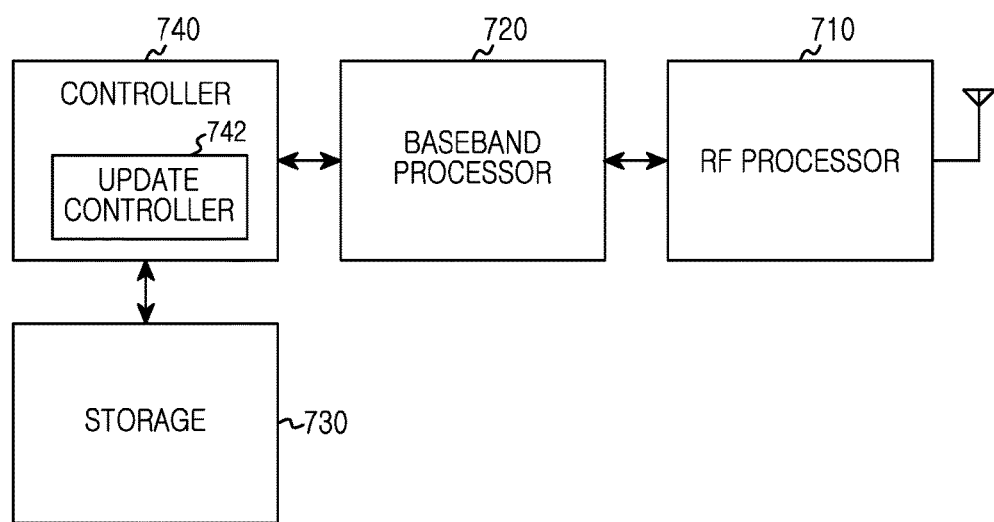
FIG. 7 illustrates a block diagram of an apparatus for controlling a data rate in a mobile communication system according to an embodiment of the present invention.

When neither of the two instances occurs and thus the offset needs to be updated, the receiving end proceeds to step 630 and updates the offset according to the presence/absence of the error through CRC and the target error rate FIG. 7 illustrates a block diagram showing an apparatus for controlling a data rate in a mobile communication system according to an embodiment of the present invention. Referring to FIG. 7, the apparatus includes a Radio Frequency (RF) processor 710, a baseband processor 720, a storage 730, a controller 740, and an update controller 742. In FIG. 7, the apparatus is a base station or mobile station.

The RF processor 710 performs functions to transmit and receive signals through a radio channel, such as signal band conversion and amplification. That is, the RF processor 710 up-converts a baseband signal provided from the baseband processor 720 into an RF band signal, transmits the RF band signal through an antenna, and down-converts an RF band signal received through the antenna into a baseband signal. For example, the RF processor 710 may include a transmission filter, a reception filter, am amplifier, a mixer, an oscillator, a Digital to Analog Converter (DAC), and an Analog to Digital Converter (ADC). In FIG. 7, only a single antenna is illustrated, but the transmitting end may include a plurality of antennas. In addition, the RF processor 710 may include a plurality of RF chains. To achieve beamforming, the RF processor 710 may adjust a phase and a size of each of the signals transmitted and received through the plurality of antennas or antenna elements.

The baseband processor 720 performs conversion between a baseband signal and a bit string according to a physical layer standard of the system. For example, when transmitting data, the baseband processor 720 generates complex symbols by encoding and modulating a transmission bit string. When receiving data, the baseband processor 720 restores a reception bit string by demodulating and decoding the baseband signal provided from the RF processor 710. For example, according to the Orthogonal Frequency Division Multiplexing (OFDM) scheme, when transmitting data, the baseband processor 720 generates complex symbols by encoding and modulating a transmission bit string, maps the complex symbols onto sub-carriers, and configures OFDM symbols by performing an Inverse Fast Fourier Transform (IFFT) operation and inserting a Cyclic Prefix (CP).

In addition, when receiving data, the baseband processor 720 also divides the baseband signal provided from the RF processor 710 on an OFDM symbol basis, restores the signals mapped onto the sub-carriers by performing an FFT operation, and then restores the reception bit string by demodulating and decoding. The baseband processor 720 and the RF processor 710 transmit and receive signals as described above. Accordingly, the baseband processor 720 and the RF processor 710 may also be referred to as a transmitter, a receiver, a transceiver, or a communicator.

The storage 730 stores data such as a basic program, an application program, and setting information for performing the operation of the apparatus for controlling the data rate. In particular, the storage 730 stores information related to the offset in the mobile communication system, and provides stored data in accordance with a request of the controller 740.

The controller 740 controls overall operations of the apparatus for controlling the data rate. For example, the controller 740 transmits and receives signals through the baseband processor 720 and the RF processor 710. In addition, the controller 740 records and reads data on and from the storage 730. According to an embodiment of the present invention, the controller 740 includes the update controller 742, which controls the apparatus for controlling the data rate to perform the procedures shown in FIGS. 1, 2, 5, and 6. According to an embodiment of the present invention, the controller 740 operates as follows:

The controller 740 determines whether to update an offset according to channel state information, i.e., according to a state of a frame. That is, when CRC succeeds as a result of performing CRC for every voice frame, a code rate of a previous frame is the highest, and a previous offset value is greater than 0, the offset is not updated. When CRC fails as a result of performing CRC for every voice frame, the code rate of the previous frame is the lowest, and the previous offset value is less than 0, the offset is not updated. When it is determined that the offset needs to be updated, the offset is updated. The offset is added to a previous CINR value regardless of whether the offset is updated, such that the CINR value is updated.

FIG. 8 illustrates a result of simulating performance according to an algorithm disclosed according to an embodiment of the present invention.

In FIG. 8, a horizontal axis indicates a frame and a vertical axis indicates a decibel (dB). Reference numeral 810 indicates a Post Detection CINR (PD-CINR), reference numeral 820 indicates an Adaptive Multi Rate (AMR) which is a voice encoding adaptive algorithm for voice communication, and reference numeral 830 indicates an offset. To adapt to a wide change of a channel state, the AMR is obtained by monitoring a communication channel state and optimally selecting a pair from a plurality of source codes and a plurality of channel codes according to the channel state. In this simulation, an offset of 6 dB is arbitrarily made at the PD-CINR and it is ensured that the OLRC compensates for this instance.

Figures 8A, 8B:
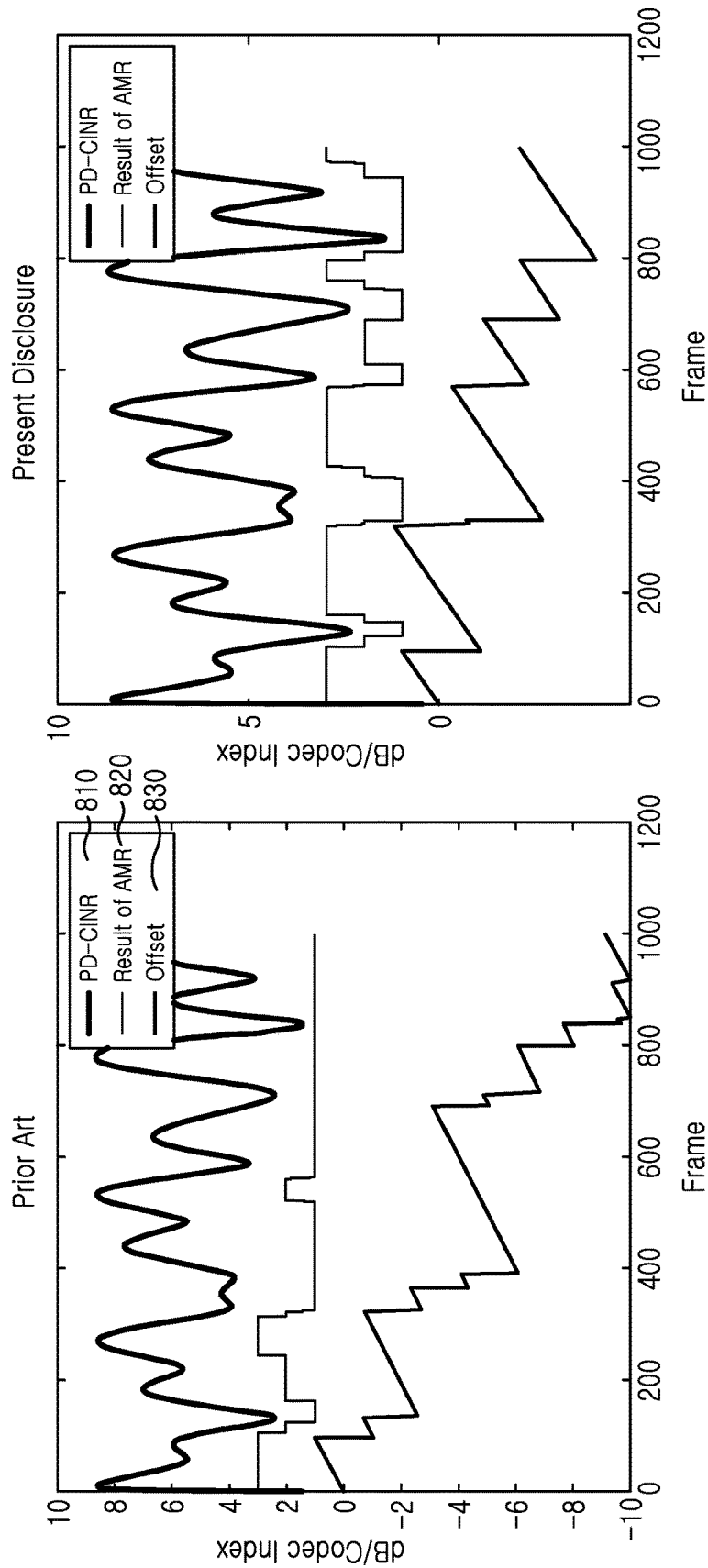
FIG. 8A and FIG. 8B illustrate results of performance simulation according to an algorithm disclosed according to an embodiment of the present invention.

The channel is set to a multipath fading channel and a moving speed of a terminal is set to 3 km/h. In this condition, the performance is observed during 1000 frames. In FIG. 8A, a conventional algorithm reduces the offset even at the lowest code rate when CRC fails, and accordingly, a high code rate cannot be rapidly selected when the channel condition improves. However, referring to FIG. 8B, an algorithm disclosed in the present invention does not reduce the offset at the lowest code rate even when CRC fails, and thus can rapidly select a high code rate rapidly when the code rate increases. As a result of the simulation, in the conventional algorithm, an average Mean Opinion Score (MOS) value, which is a criterion for a voice quality, is 3.6155, and, in the algorithm of the present invention, the MOS value is 3.7503, which is greater than that of the conventional algorithm by about 0.14, as shown in Table 1 as follows:

TABLE 1

|  | conventional algorithm | algorithm of present invention |
|---|---|---|
| average MOS | 3.6155 | 3.7503 |

While the present invention has been described with reference to certain embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present invention.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device such as a Read Only Memory (ROM), whether erasable or rewritable or not, or in the form of memory such as, Random Access Memory (RAM), memory chips, device or integrated circuits, or on an optically or magnetically readable medium such as, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments of the present invention provide a program comprising code for implementing apparatus or a method, as claimed in any one of the claims of this specification, and a machine-readable storage storing such a program. Still further, such programs may be conveyed electronically via any medium, such as a communication signal carried over a wired or wireless connection and embodiments suitably encompass the same.

What is claimed is:

1. A method for operating a first apparatus in a wireless communication system, the method comprising:
   receiving, from a second apparatus, channel information for a previous channel quality;
   transmitting, to the second apparatus, a first packet according to a first channel quality obtained by applying a first offset to the previous channel quality;
   changing an offset from the first offset to a second offset determined based on whether or not the first packet is successfully received by the second apparatus;
   determining whether or not a second channel quality is within a range from a minimum quality to a maximum quality, the second channel quality being obtained by applying the second offset to the previous channel quality;
   if the second channel quality is not within the range, determining that the offset is maintained as the first offset in a second packet; and transmitting, to the second apparatus, the second packet according to the first channel quality in which the first offset is applied.

2. The method of claim 1, wherein determining whether or not the second channel quality is within the range comprises:
  if the first packet is successfully received, determining whether or not the second channel quality is higher than the maximum quality; and
  if the second channel quality is higher than the maximum quality, determining that the second channel quality is not within the range, and
  wherein the second offset is greater than the first offset.

3. The method of claim 1, wherein determining whether or not the second channel quality is within the range comprises:
  if the first packet is not successfully received, determining whether or not the second channel quality is lower than the minimum quality; and
  if the second channel quality is lower than the minimum quality., determining that the second channel quality is not within the range, and
  wherein the second offset is not greater than the first offset.

4. The method of claim 1, wherein whether or not the first packet is successfully received is determined by a cyclic redundancy check (CRC),
  wherein transmitting the second packet comprises:
    identifying a modulation and coding scheme (MCS) level according to the first channel quality; and
    transmitting the second packet according to the MCS level,
  wherein the range corresponds to a range of the MCS level from a lowest MCS level to a highest MCS level in a link table, and
  wherein each MCS level is defined based on a threshold in the link table.

5. The method of claim 1, wherein the channel information is received based on a closed-loop rate control (CLRC), and
  wherein the offset is usable for correcting a difference between the previous channel quality and a target channel quality and is applied based on an outer-loop rate control (OLRC).

6. The method of claim 1, wherein determining whether or not the second channel quality is within the range comprises:
  determining whether or not the second channel quality is higher than a previous channel quality by the second offset; and
  determining whether or not the previous channel quality is one of the maximum quality and the minimum quality.

7. The method of claim 1, further comprising:
  receiving, from the second apparatus, feedback information for indicating whether or not the first packet is successfully received by the second apparatus; and
  if the second channel quality is within the range, transmitting, to the second apparatus, a packet according to the second channel quality.

8. The method of claim 1, further comprising:
  initializing the offset when a call setup is performed, a handover is performed, or a codec is changed.

9. A first apparatus in a wireless communication system, the first apparatus comprising:
  at least one transceiver; and
  at least one processor operably coupled to the at least one transceiver and configured to:
    receive, from a second apparatus, channel information for a previous channel quality,
    transmit, to the second apparatus, a first packet according to a first channel quality obtained by applying a first offset to the previous channel quality,
    change an offset from the first offset to a second offset determined based on whether or not the first packet is successfully received by the second apparatus,
    determine whether or not a second channel quality is within a range from a minimum quality to a maximum quality, the second channel quality being obtained by applying the second offset to the previous channel quality,
    if the second channel quality is not within the range, determine that the offset is maintained as the first offset in a second packet, and
    transmit, to the second apparatus, the second packet according to the first channel quality in which the first offset is applied.

10. The first apparatus of claim 9, wherein the at least one processor is further configured to determine whether or not the second channel quality is within the range by:
  determining whether or not the second channel quality is higher than the maximum quality, if the first is successfully received; and
  determining that the second channel quality is not within the range, if the second channel quality is higher than the maximum quality, and
  wherein the second offset is greater than the first offset.

11. The first apparatus of claim 9, wherein the at least one processor is further configured to determine whether or not the second channel quality is within the range by:
  determining whether or not the second channel quality is lower than the minimum quality, if the first packet is not successfully received; and
  determining that the second channel quality is not within the range, if the second channel quality is lower than the minimum quality, and
  wherein the second offset is not greater than the first offset.

12. The first apparatus of claim 9, wherein whether or not the first packet is successfully received is determined by a cyclic redundancy check (CRC),
  wherein the at least one processor is further configured to transmit the current packet by:
    identifying a modulation and coding scheme (MCS) level according to the first channel quality; and
    transmitting the second packet according to the MCS level,
  wherein the range corresponds to a range of the MCS level from a lowest MCS level to a highest MCS level in a link table, and
  wherein each MCS level is defined based on a threshold in the link table.

13. The first apparatus of claim 9, wherein the channel information is received based on a closed-loop rate control (CLRC), and
  wherein the offset is usable for correcting a difference between the previous channel quality and a target channel quality and is applied based on an outer-loop rate control (OLRC).

14. The first apparatus of claim 13, wherein the at least one processor is further configured to determine whether or not the second channel quality is within the range by:
   determining whether or not the second channel quality is higher than the previous channel quality by the second offset; and
   determining whether or not the previous channel quality is one of the maximum quality and the minimum quality.

15. The first apparatus of claim 9, wherein the at least one processor is further configured to:
   receive, from the second apparatus, feedback information for indicating whether or not the first packet is successfully received by the second apparatus, and
   transmit, to the second apparatus, a packet according to the second channel quality, if the second channel quality is within the range.

16. The first apparatus of claim 9, wherein the at least one processor is further configured to initialize the offset when a call setup is performed, a handover is performed, or a codec is changed.

17. A second apparatus in a wireless communication system, the second apparatus comprising:
   at least one transceiver; and
   at least one processor operably coupled to the at least one transceiver, and configured to:
      transmit, to a first apparatus, channel information for a previous channel quality,
      receive, from the first apparatus, a first packet according to a first channel quality obtained by applying a first offset to the previous channel quality,
      transmit, to the first apparatus, a signal for indicating whether or not a first packet is successfully received, and
      receive, from the first apparatus, a second packet based on the signal,
   wherein the signal is used to determine a second offset by the first apparatus,
   wherein the second offset is applied to the previous channel quality to obtain a second channel quality by the first apparatus,
   wherein, if the second channel quality is not within a range from a minimum quality to a maximum quality, an offset is maintained as the first offset in the second packet and the second packet is received based on the first channel quality in which the first offset is applied, and
   wherein, if the second channel quality is within the range, the second packet is received based on the second channel quality.

18. The second apparatus of claim 17, wherein the second offset is greater than the first offset, if the signal indicates that the first packet is successfully received, and
   wherein the second offset is not greater than the first offset, if the signal does not indicate that the first packet is successfully received.

19. The second apparatus of claim 17, wherein the channel information is received based on a closed-loop rate control (CLRC), and
   wherein the offset is usable for correcting a difference between the previous channel quality and a target channel quality, and is applied based on an outer-loop rate control (OLRC).

20. The second apparatus claim 17, wherein
   whether or not the second channel quality is within the range is determined based on:
      whether or not the second channel quality is higher than a previous channel quality by the second offset, and
      whether or not the previous channel quality is one of the maximum quality and the minimum quality.

* * * * *